Patented Dec. 19, 1933

1,940,397

UNITED STATES PATENT OFFICE 1,940,397

PROCESS FOR BREAKING PETROLEUM EMULSIONS

Melvin De Groote, St. Louis, and Arthur F. Wirtel, Richmond Heights, Mo., assignors to Tretolite Company, Webster Groves, Mo., a corporation of Missouri No Drawing. Application January 21, 1933
Serial No. 652,947

9 Claims. (Cl. 196—4)

This invention relates to the treatment of emulsions of mineral oil and water, such as petroleum emulsions, for the purpose of separating the oil from the water.

Petroleum emulsions are of the water-in-oil type, and comprise fine droplets of naturally-occurring waters or brines, dispersed in a more or less permanent state throughout the oil which constitutes the continuous phase of the emulsion. They are obtained from producing wells and from the bottoms of oil storage tanks, and are commonly referred to as "cut oil", "roily oil", "emulsified oil" and "bottom settlings".

The object of our invention is to provide a novel, inexpensive and efficient process for separating emulsions of the kind referred to into their component parts of oil and water or brine.

Briefly described, our process consists in subjecting a petroleum emulsion of the water-in-oil type, to the action of a treating agent or demulsifying agent of a particular composition hereinafter described, thereby causing the emulsion to break down and separate into its component parts of oil and water or brine, when the emulsion is permitted to remain in a quiescent state after such treatment.

Various classes of materials have heretofore been used or suggested as demulsifying agents in the resolution of petroleum emulsions, such as water softeners, modified fatty acids, hydroxy aromatics, various non-fatty sulfonic acids, etc. Mixtures of materials of the kind above mentioned have also been used or suggested, sometimes with improved results and sometimes with inferior results. Generally, when various classes of materials are efficient demulsifiers, mixtures of such materials are also efficient demulsifiers, provided that the materials constituting a mixture are not incompatible; but the value or effectiveness of a mixture produced by combining a known demulsifier selected from one class, with another known demulsifier selected from a different class, can easily be determined by simple routine chemical experimentation involving only chemical skill or knowledge, as distinguished from inventive ability. There have been instances where particular petroleum emulsions or particular types of emulsion would not respond to treatment with the individual members of a class or classes of demulsifiers, or with mixtures produced from selected members of two different classes of known demulsifiers, and when such emulsions are encountered, inventive ability is often required to produce a demulsifying agent that will successfully "break" or treat the emulsion under consideration. An example of a demulsifying agent of the kind last referred to is the one described in U. S. Patent No. 1,659,998, to Keiser, dated February 21, 1928, which demulsifying agent consists of a mixture of previously known demulsifiers, combined in certain specific proportions.

The treating agent or demulsifying agent contemplated by our process is of the kind that is composed of a mixture of materials, but it is also that particular type of mixture which is characterized by great specificity, both in the substances of which it is composed, and in the quantities or proportions of said substances. It consists of or comprises non-sulfo un-neutralized hydroxy fatty acids mixed with certain specific substituted aromatic sulfonic acids in such a way that the mixture is soluble in water to produce a clear solution. Preferably, our improved mixture is derived from a non-sulfo, unsaponified, hydroxy fatty body and an alkylated naphthalene sulfonic acid salt of the particular kind hereinafter described. The use of fatty acids for demulsification is well known. The use of fatty acids in which certain elements or radicals have been added to or substituted in the fatty chain, are also well known. The hydroxylated type of fatty acid has long been recognized as being of particular value in demulsification. Hydroxy fatty acids are peculiar, insofar that they are generally oil-insoluble. This characteristic apparently is due to the presence of the alcoholic hydroxyl radical.

On the other hand, these hydroxylated fatty acids, like other similar fatty acids, have no water-solubility. Substantially three methods have been employed to introduce water solubility into hydroxylated fatty acids. One procedure is to saponify or neutralize the acid and thus produce a water-soluble salt. Another procedure is to introduce a sulfo group into the fatty acid radical, and thus supply water-solubility. Sometimes a combination of the two previous methods are employed. A third procedure is to emulsify the fatty material in a highly concentrated solution of a suitable emulsifier, such as ordinary soap or glue, so as to produce a product miscible with water to produce a coarse, opaque suspension. In some cases saponification seems to greatly decrease the efficiency of the reagent. The same is true in regard to the introduction of a sulfo group or a mixture with emulsifier.

We have found that if a non-sulfo un-neutralized hydroxy fatty acid is mixed with a substituted alkylated aromatic of the kind hereinafter described containing not over 50% of water, the resultant mixture is an excellent demulsifier, provided that sufficient alkylated aromatic sulfonic acid salt has been added, so that a 10% solution of the mixture in water produces a clear non-turbid solution. In other words, the solution thus produced must be one in which the hydroxylated fatty acid is substantially in molecular or near molecular dispersion. A 10% solution of an emulsion of hydroxylated fatty acids produced by agency of glue or soap, as previously referred to, gives an opaque suspension or milky solution and is not effective. Our invention is limited to those mixtures which will give a clear solution when 10% of the mixture is added to water. Furthermore, our invention is limited to those mixtures in which the alkylated aromatic sulfonic acid salt is present in not over 3 parts of the same to one part of hydroxylated fatty acid. Insofar that the fatty bodies are unsaponified, it is permissible to use the alkylated aromatic sulfonic acid, instead of the neutralized salt, if there is no objection to possible corrosive action, which may take place. In any event, however, a 10% solution of the mixture must give a clear solution in water, and not a turbid suspension.

The substituted aromatic sulfonic acids used as a part or ingredient of our improved demulsifying agent, must be produced from or obtained from alcohols having three carbon atoms, and not more than five carbon atoms, i. e., butyl alcohol, propyl alcohol, and amyl alcohol. It is to be understood that the isomeric alcohols, such as normal butyl, isobutyl, secondary butyl, etc. are considered equally satisfactory, and that the isomeric sulfonic acids, such as the alpha and beta are also considered equally suitable for our specific reagent. Moreover, our improved mixture is restricted to alkylated naphthalene sulfonic acids in the form of a water-soluble alkali salt. The ammonium radical is considered as an alkali along with the metals sodium and potassium. Ammonium hydroxide is just as satisfactory for neutralizing the sulfonic acids as is sodium or potassium hydroxide. In the manufacture of ammonium soaps, for certain purposes, it has been found that improved products can sometimes be obtained by replacing the ammonia with certain hydroxy amines, such as triethanolamine, which act just the same as ammonia. It is understood that these hydroxy amines which act like ammonia are considered the equivalent of the ammonium radical or the equivalent of an alkali metal in the present invention. These substituted naphthalene sulfonic acids of the type described represent only a small percentage of the large number of substituted polynuclear sulfonic acids. For instance, substituted aromatic sulfonic acids previously disclosed as being suitabe for demulsification, include those derived from the higher alkyl alcohols, as well as from aryl alcohols and aralkyl alcohols, and even cyclo alcohols. Furthermore, previously known demulsifiers include not only the substitution of alcohol radicals in the aromatic nucleus but also sulfonic acids in which aldehyde residues, ketone residues, or even fatty residues are substituted in the aromatic nucleus. Then too, instead of introducing such residues into an aromatic nucleus, it has been suggested to introduce them into aromatic derivatives, such as hydroxy, chloro, nitro, or carboxyl derivatives. It has been suggested to use this multitude of sulfonic acids in the form of calcium or magnesium salts, or in the form of various esters, or even after acylation with an amine in the manner that the sulfonyl radical substitutes or replaces one of the hydrogens of the selected amine.

We have selected a few members from this large class of aromatic substituted sulfonic acids, and as previously stated, we contemplate using only the propylated or butylated or amylated naphthalene sulfonic acid, or the sodium, potassium, or ammonium salt of same. We do not contemplate a reagent in which some other substituent group, such as a hydroxyl group, is present in the nucleus.

Hydroxylated fatty acids suitable for use in our improved mixture are commercially available or can be easily prepared by conventional procedure. For instance, castor oil may be split to produce ricinoleic acid which is a suitable material. Castor oil can be blown so as to absorb some oxygen and subsequently split in the usual manner to yield a satisfactory material. Ricinoleic acid may be heated so as to partially polymerize the same, and such polymerized ricinoleic acid will serve as a suitable material. An ester acid produced by combination of the hydrogen of hydroxy stearic acid molecules with the hydroxyl of ricinoleic acid molecule will produce a suitable material. Oleic acid hydrogen hydrogen sulfate may be hydrolyzed to yield a suitable hydroxy acid body. Sulfated castor oil, such as Turkey red oil, may be hydrolyzed to yield a suitable hydroxy body. In all cases the hydroxy fatty acid body must be free from a sulfo group and must be unsaponified, although it may be esterified, as in the case of a glyceride, or may be a hydroxy lactone or hydroxy lactone-like material, such as a material produced by heating di-hydroxy stearic acid, or else a hydroxy ester acid, which we consider as being lactone-like.

The mixture or demulsifying agent that we prefer to use in practicing our process is prepared or produced in the following manner: Turkey red oil is obtained from castor oil in the usual manner by sulfation at 35° C. The washed product is boiled with water for approximately two hours in the presence of a small amount of sulfuric acid. At the end of the two hour period, the sulfo group should be completely decomposed. When tests indicate that the sulfo group is completely hydrolyzed, the boiling process is stopped, the mixture is allowed to settle, and the dilute acid water is withdrawn. One part of this material thus obtained is mixed with three parts of butylated naphthalene sulfonic acid salt derived from a mixture of two molecular parts of butyl alcohol and one molecular part of naphthalene in the customary manner. This mixture of mono and dibutylated naphthalene sulfonic acid is employed in the form of an ammonium salt. Thus, one part of the hydroxylated fatty acid prepared as previously described is mixed with three parts of butylated naphthalene sulfonic acid ammonium salt. A 10% solution of this mixture in water is prepared and should give a clear water solution, indicating that the solution is substantially molecular and that in any event it is not a mere turbid suspension.

We believe that from the foregoing it will be apparent that our invention is not concerned with all mixtures of two classes of materials which have been previously used for demulsification, but on the contrary, is concerned with only a very limited class or type of mixtures that must have the characteristic or quality of being able to produce a clear water solution in 10% concentration, even though there is present a large proportion of unsaponified, unsulfated, fatty material. The superiority of our improved mixture or demulsifying agent is based upon its ability to treat certain emulsions to a somewhat better advantage and at a somewhat lower cost than is possible with previously known demulsifiers. We do not contend that it is effective for all types and kinds of petroleum emulsions, and we do not believe that it will supersede the majority of the modified fatty acids, sulfated fatty acids, etc. heretofore used extensively as treating agents in the resolution of petroleum emulsions. We believe that a treating mixture of the kind previously described will find comparatively limited application, so far as the majority of oil field emulsions are concerned, but it has commercial value, in that it will economically break or resolve certain oil field emulsions in a small number of cases which cannot be treated as easily and at so low a cost, with demulsifying agents heretofore available.

In practicing our process, a treating or demulsifying agent of the kind above described may be brought in contact with the emulsion to be treated in any of the numerous ways now employed in the treatment of petroleum emulsions of the water-in-oil type with chemical demulsifying agents, such, for example, as by introducing the treating agent into the well in which the emulsion is produced; introducing the treating agent into a conduit through which the emulsion is flowing; introducing the treating agent into a tank in which the emulsion is stored; or introducing the treating agent into a container that holds a sludge obtained from the bottom of an oil storage tank. In some instances, it may be advisable to introduce the treating agent into a producing well in such a way that it will become mixed with water and oil that are emerging from the surrounding strata, before said water and oil enter the barrel of the well pump or the tubing up through which said water and oil flow to the surface of the ground. After treatment, the emulsion is allowed to stand in a quiescent state, usually in a settling tank, and usually at a temperature varying from atmospheric temperature to about 200° F., so as to permit the water or brine to separate from the oil, it being preferable to keep the temperature low enough to prevent the volatilization of valuable constituents of the oil. If desired, the treated emulsion may be acted upon by one or more of the various kinds of apparatus now used in the operation of breaking petroleum emulsions, such as homogenizers, hay tanks, gun barrels, filters, centrifuges, or electrical dehydrators.

The amount of treating agent that may be required to break the emulsion may vary from approximately 1 part of treating agent to 500 parts of emulsion, up to 1 part of treating agent to 20,000, or even 30,000 parts of emulsion. The proportion depends on the type of emulsion being treated, and also upon the equipment being used, and the temperature employed. In treating exceptionally refractory emulsions of the kinds known as "tank bottoms" and "residual pit oils", the ratio of 1:500, above referred to, may be required. In treating fresh emulsions, i. e., emulsions that will yield readily to the action of chemical demulsifying agents, the ratio of 1:30,000, above referred to may be sufficient to produce highly satisfactory results. In general, we have found that for an average petroleum emulsion, a ratio of 1 part of treating agent to 5,000 parts of emulsion will usually be found to produce commercially satisfactory results.

Having thus described our invention, what we claim as new and desire to secure by Letters Patent is:

1. A process for breaking petroleum emulsions of the water-in-oil type, which consists in subjecting the emulsion to the action of a demulsifying agent consisting of a mixture capable of mixing with water to form a 10% solution or suspension, said mixture being derived from (A) a non-sulfo, unsaponified, hydroxy, fatty body selected from the class comprising acids, esters and lactone or lactone-like materials; and (B) a water-soluble alkali salt of an alkylated naphthalene sulfonic acid derived from an alcohol having at least three carbon atoms and not more than five carbon atoms, the said mixture being characterized by the fact that there is not more than three parts of the sulfonic acid salt to one part of the fatty body.

2. A process for breaking petroleum emulsions of the water-in-oil type, which consists in subjecting the emulsion to the action of a demulsifying agent consisting of a mixture capable of mixing with water to form a 10% solution or suspension, said mixture being derived from (A) a non-sulfo, unsaponified, hydroxy, fatty body selected from the class comprising acids, esters and lactones or lactone-like materials obtained from castor oil; and (B) a water-soluble alkali salt of an alkylated naphthalene sulfonic acid derived from an alcohol having at least three carbon atoms and not more than five carbon atoms, the said mixture being characterized by the fact that there is not more than three parts of the sulfonic acid salt to one part of the fatty body.

3. A process for breaking petroleum emulsions of the water-in-oil type, which consists in subjecting the emulsion to the action of a demulsifying agent consisting of a mixture capable of mixing with water to form a 10% solution or suspension, said mixture being derived from (A) a non-sulfo, unsaponified, hydroxy, fatty body selected from the class comprising acids, esters and lactones or lactone-like materials obtained from castor oil by hydrolysis of a sulfo body; and (B) a water-soluble alkali salt of an alkylated naphthalene sulfonic acid derived from an alcohol having at least three carbon atoms and not more than five carbon atoms, the said mixture being characterized by the fact that there is not more than three parts of the sulfonic acid salt to one part of the fatty body.

4. A process for breaking petroleum emulsions of the water-in-oil type, which consists in subjecting the emulsion to the action of a demulsifying agent consisting of a mixture capable of mixing with water to form a 10% solution or suspension, said mixture being derived from (A) a non-sulfo, unsaponified, hydroxy, fatty body selected from the class comprising acids, esters and lactone or lactone-like materials; and (B) a water-soluble alkali salt of a butylated, naphthalene, sulfonic acid, the said mixture being characterized by the fact that there is not more than three parts of the sulfonic acid salt to one part of the fatty body.

5. A process for breaking petroleum emulsions of the water-in-oil type, which consists in subjecting the emulsion to the action of a demulsifying agent consisting of a mixture capable of mixing with water to form a 10% solution or suspension, said mixture being derived from (A) a non-sulfo, unsaponified, hydroxy, fatty body selected from the class comprising acids, esters and lactones or lactone-like materials obtained from castor oil; and (B) a water-soluble alkali salt of a butylated, naphthalene, sulfonic acid, the said mixture being characterized by the fact that there is not more than three parts of the sulfonic acid salt to one part of the fatty body.

6. A process for breaking petroleum emulsions of the water-in-oil type, which consists in subjecting the emulsion to the action of a demulsifying agent consisting of a mixture capable of mixing with water to form a 10% solution or suspension, said mixture being derived from (A) a non-sulfo, unsaponified, hydroxy, fatty body selected from the class comprising acids, esters and lactones or lactone-like materials and obtained from castor oil by hydrolysis of a sulfo body; and (B) a water-soluble alkali salt of a butylated, naphthalene, sulfonic acid, the said mixture being characterized by the fact that there is not more than three parts of the sulfonic acid salt to one part of the fatty body.

7. A process for breaking petroleum emulsions of the water-in-oil type, which consists in subjecting the emulsion to the action of a demulsifying agent consisting of a mixture capable of mixing with water to form a 10% solution or suspension, said mixture being derived from (A) a non-sulfo, unsaponified, hydroxy, fatty body selected from the class comprising acids, esters and lactone or lactone-like materials; and (B) a water-soluble ammonium salt of a butylated, naphthalene, sulfonic acid, the said mixture being characterized by the fact that there is not more than three parts of sulfonic acid salt to one part of hydroxylated fatty acid material.

8. A process for breaking petroleum emulsions of the water-in-oil type, which consists in subjecting the emulsion to the action of a demulsifying agent consisting of a mixture capable of mixing with water to form a 10% solution or suspension, said mixture being derived from (A) a non-sulfo, unsaponified, hydroxy, fatty body selected from the class comprising acids, esters and lactones or lactone-like materials and obtained from castor oil; and (B) a water-soluble ammonium salt of a butylated, naphthalene, sulfonic acid, the said mixture being characterized by the fact that there is not more than three parts of sulfonic acid salt to one part of hydroxylated fatty acid material.

9. A process for breaking petroleum emulsions of the water-in-oil type, which consists in subjecting the emulsion to the action of a demulsifying agent consisting of a mixture capable of mixing with water to form a 10% solution or suspension, said mixture being derived from (A) a non-sulfo, unsaponified, hydroxy, fatty body selected from the class comprising acids, esters and lactones or lactone-like materials obtained from castor oil by hydrolysis of the fatty body; and (B) a water-soluble ammonium salt of a butylated, naphthalene, sulfonic acid, the said mixture being characterized by the fact that there is not more than three parts of sulfonic acid salt to one part of hydroxylated fatty acid material.

MELVIN DE GROOTE.
ARTHUR F. WIRTEL.